United States Patent [19]

Williams

[11] 4,360,662
[45] Nov. 23, 1982

[54] CONTINUOUS COUNTERCURRENT EXTRACTION PROCESS FOR REMOVING WATER-SOLUBLE IMPURITIES FROM WATER IMMISCIBLE POLYMER SOLUTIONS

[75] Inventor: Albert G. Williams, West Orange, N.J.

[73] Assignee: Celanese Corporation, New York, N.Y.

[21] Appl. No.: 208,201

[22] Filed: Nov. 19, 1980

[51] Int. Cl.$^3$ .................. C08G 63/70; C08G 63/74
[52] U.S. Cl. .................................. 528/499; 528/191; 528/491
[58] Field of Search .................... 528/499, 491, 191

[56] References Cited

U.S. PATENT DOCUMENTS

| | | | |
|---|---|---|---|
| 3,234,167 | 2/1966 | Sweeny | 528/191 |
| 3,783,147 | 1/1974 | Calicchia et al. | 528/499 |
| 3,883,467 | 5/1975 | Stackman et al. | 528/191 |
| 3,905,946 | 9/1975 | Nieswandt et al. | 528/499 |
| 4,051,113 | 9/1977 | Kissel et al. | 528/499 |

Primary Examiner—Lester L. Lee
Attorney, Agent, or Firm—Burns, Doane, Swecker & Mathis

[57] ABSTRACT

There is disclosed a continuous countercurrent extraction process for removing tertiary amine hydrochloride impurities which are soluble in water from a water immiscible polymer solution of a halogenated aromatic polyester which has a viscosity of at least about 10 poise and a density greater than about 1.0 gm/cc. This process comprises (a) introducing the polymer solution at the top of an extraction column and introducing water at the bottom of the column to form a two phase mixture, and (b) mechanically agitating the mixture in a particularly defined manner in order to extract the water-soluble impurities from the polymer solution and economically recover the tertiary amine hydrochloride.

20 Claims, 1 Drawing Figure

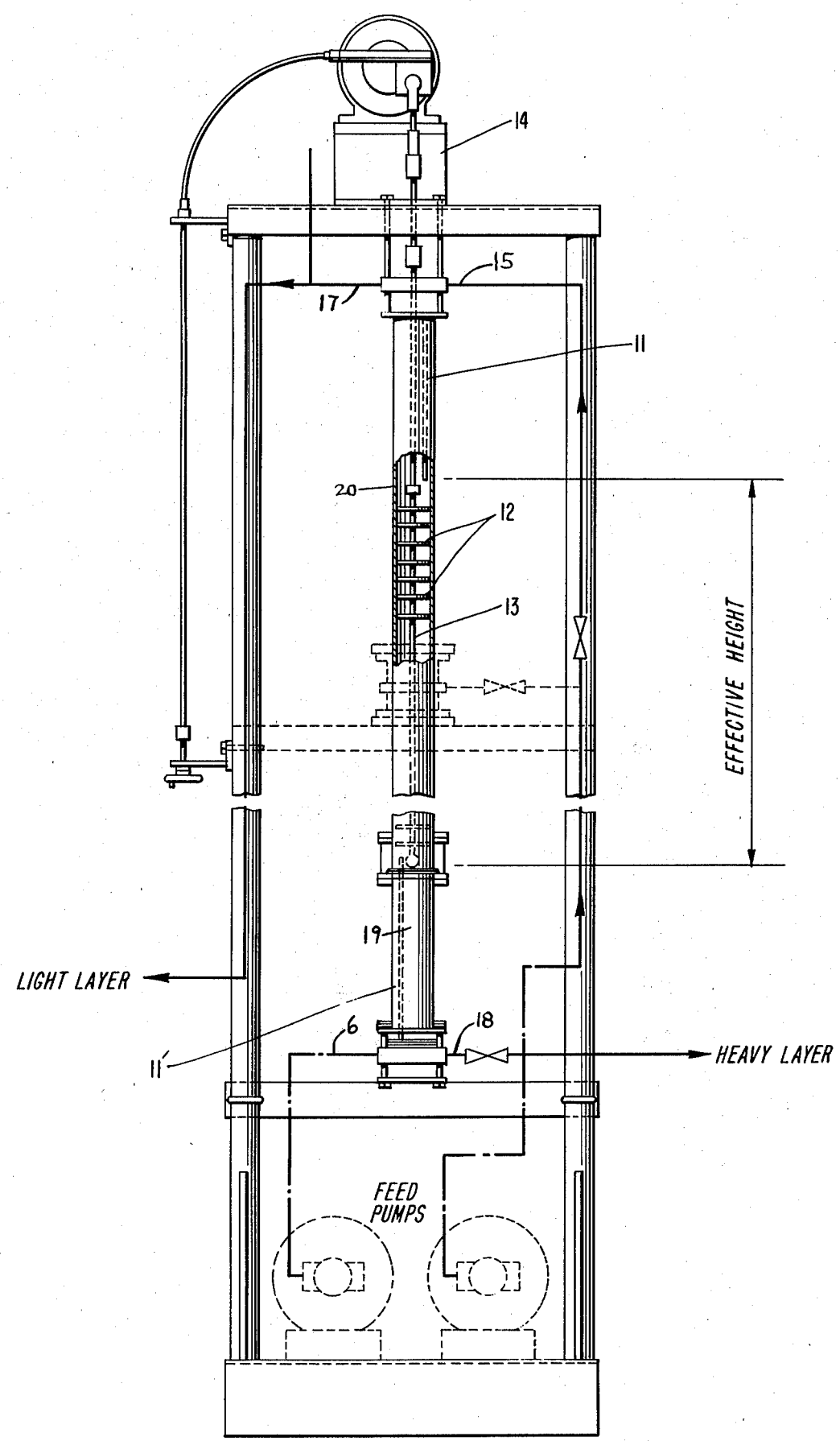

CONTINUOUS COUNTERCURRENT EXTRACTION PROCESS FOR REMOVING WATER-SOLUBLE IMPURITIES FROM WATER IMMISCIBLE POLYMER SOLUTIONS

BACKGROUND OF THE INVENTION

There is a need for a continuous process for separating tertiary amine hydrochloride impurities from water immiscible polymer solutions of a halogenated aromatic polyester containing high concentrations of polymer solids which are therefore highly viscous. For example, when halogenated aromatic polyesters are prepared by the solution polymerization technique, as disclosed, for example, in U.S. Pat. No. 3,234,167, which is hereby incorporated by reference, there may be present in the reaction mixture large amounts of triethylamine hydrochloride both solubilized and suspended. This triethylamine hydrochloride must be removed from the polymer product. The reaction mixture, however, is a rather viscous solution having a viscosity of generally more than about 50 poise.

Although countercurrent extraction has been used to remove impurities from comparatively non-viscous solutions, the countercurrent extraction technique has not been applied to viscous solutions (i.e., solutions having a viscosity of more than about 10 poise) since high viscosity solutions do not readily form small droplets. The water-soluble impurities cannot therefore be readily extracted from large droplets having a relatively low surface area because transfer of water-soluble impurities through such large droplets is much less efficient than it is through small droplets. Furthermore, the large difference in viscosity between the polymer solution and the water extractant hinders the diffusion of the hydrochloride from the organic phase to the aqueous phase and complicates the extraction process even further. A commercial countercurrent extraction process also requires that the tertiary amine hydrochloride be economically recovered from the extract so that it can be reused in further processing operations.

Prior art methods for removing triethylamine hydrochloride from viscous solutions of halogenated aromatic polyesters in solvents such as methylene chloride comprise multiple batch extractions with a volume of water equal to the dope volume for each extraction. Such multiple batch extractions are time-consuming and uneconomical because of both capital expense and lack of recoverability of the triethylamine hydrochloride. Furthermore, multiple batch extractions are impractical for a production operation.

The search has continued for a continuous countercurrent extraction process for removing water-soluble tertiary amine hydrochloride impurities from viscous polymer solutions of halogenated aromatic polyesters. This invention was made as a result of that search.

OBJECTS AND SUMMARY OF THE INVENTION

Accordingly, a general object of the present invention is to avoid or substantially alleviate the above problems of the prior art.

Another object of the present invention is to provide a countercurrent extraction process for removing tertiary amine hydrochlorides from a viscous non-aqueous solution of halogenated aromatic polyesters in such a way that the tertiary amine hydrochlorides can be economically recovered.

A still more specific object of the present invention is to provide a continuous countercurrent extraction process for removing triethylamine hydrochloride from a viscous non-aqueous solution of a halogenated aromatic polyester.

Other objects and advantages of the invention will become apparent from the following summary and description of the preferred embodiments of the present invention.

In one aspect of the present invention there is provided a continuous countercurrent extraction process for removing a tertiary amine hydrochloride from a water immiscible solution of a halogenated aromatic polyester, said tertiary amine hydrochloride being dissolved in said water immiscible solution in an amount of greater than about 0.5% by weight, which comprises:

(a) introducing a water immiscible solution, having a viscosity of at least about 10 poise and not greater than about 300 poise and a density of greater than about 1.0 gm/cc, of a halogenated aromatic polyester of the recurring structural formula:

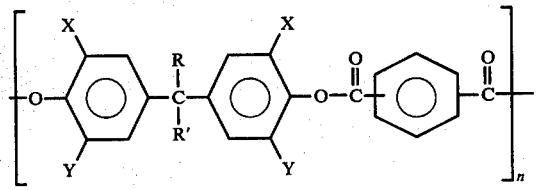

where X which may be the same or different is chlorine or bromine, Y which may be the same or different is hydrogen, chlorine or bromine, R and R' may be the same or different and represent lower alkyl groups, hydrogen, or together constitute a cyclic hydrocarbon group, and n=at least 10, at the top of an extraction column and introducing water at the bottom of said column to form a two-phase mixture comprising an organic phase and an aqueous phase with each phase flowing in countercurrent directions;

(b) controlling the volume flow ratio of the organic phase to aqueous phase to be from about 2:1 to about 10:1;

(c) mechanically agitating said mixture in a manner sufficient to (1) permit the aqueous phase to travel at an upward velocity of not less than the relative downward velocity of organic phase and (2) extract said tertiary amine hydrochloride from the organic phase in an amount sufficient to yield a whole raffinate having a chloride ion content of not greater than about 500 ppm; and (d) controlling the temperature of the two phases during extraction in a manner sufficient to prevent vaporization of the polymer solvent of the organic phase to the extent that the organic phase does not become lighter than the aqueous phase and travel in a direction concurrently therewith.

BRIEF DESCRIPTION OF THE DRAWING

The FIGURE is a side view and partial cross section of a Karr reciprocating plate extraction column available from Chem-Pro Corporation.

DESCRIPTION OF THE PREFERRED EMBODIMENTS

The polymer solution which is employed in the process of the present invention will be characterized as containing water-soluble impurities which are to be extracted, a density greater than water in order for the polymer solution to be capable of falling through water, and a high viscosity relative to the viscosity of water, i.e., it will have a viscosity generally at least about 10 poise.

The present process is particularly useful in extracting the water-soluble impurities from a solution of halogenated aromatic polyesters in methylene chloride. Accordingly, the preparation of these particular polymers will be described in detail although it should be remembered that the process is also useful to extract water-soluble impurities from water immiscible solutions of other polymers.

Halogenated aromatic polyesters prepared in accordance with the process of this invention have recurring units of the structural formula:

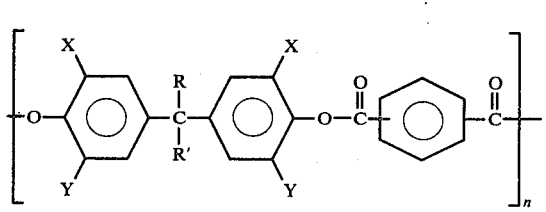

wherein X, which may be the same or different, is chlorine or bromine, Y, which may be the same or different, is hydrogen, chlorine, or bromine, R and R' may be the same or different and represent lower alkyl groups (e.g., having from 1 to about 5 carbon atoms), hydrogen, or together constitute a cyclic hydrocarbon group, and n equals at least 10 (e.g., n equals about 40 to 400, typically about 50). Commonly the aromatic polyester utilized in accordance with the process of this invention has a chlorine and/or bromine content of about 15% to about 60% by weight based upon the weight of the aromatic polyester (e.g., a chlorine and/or bromine content of about 25% to 50% by weight). As is apparent from the structural formula, the aromatic polyester is chlorinated and/or brominated in the sense that these substituents are directly attached to an aromatic ring. Preferably the halogen substituents are all bromine.

The halogenated aromatic polyesters conforming to the above-defined formula are prepared by reacting substantially equimolar amounts of (1) an appropriate bisphenol, and (2) a diacid halide such as isophthaloyl chloride, terephthaloyl chloride, or mixtures thereof by solution polymerization.

Thus, in the solution polymerization technique, the appropriate bisphenol is initially dissolved in a suitable solvent. A catalyst or acid acceptor is also dissolved in the solvent prior to the addition of the diacid halide.

The bisphenols which are useful in the preparation of the polyesters having recurring units of the formula illustrated above have the structure:

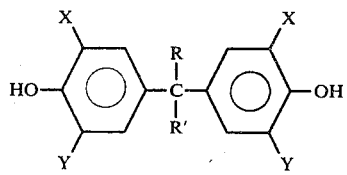

where X, Y, R and R' have the same significance as set forth hereinabove. Suitable bisphenols which are useful in the practice of this invention include bis(3,5-dibromo-4-hydroxyphenyl)methane; bis(3,5-dichloro-4-hydroxyphenyl)methane; bis(3-chloro-5-bromo-4-hydroxyphenyl)methane; 1,1-bis(3,5-dibromo-4-hydroxyphenyl)ethane; 1,1-bis-(3,5-dichloro-4-hydroxyphenyl)ethane; 1,1-bis-(3-chloro-5-bromo-4-hydroxyphenyl)ethane; 1,1-bis-(3,5-dibromo-4-hydroxyphenyl)propane; 1,1-bis-(3,5-dichloro-4-hydroxyphenyl)propane; 1,1-bis-(3-chloro-5-bromo-4-hydroxyphenyl)propane; 2,2-bis-(3,5-dibromo-4-hydroxyphenyl)propane; 2,2-bis-(3,5-dichloro-4-hydroxyphenyl)propane; 2,2-bis-(3-chloro-5-bromo-4-hydroxyphenyl)propane; bis-(3-bromo-4-hydroxyphenyl)methane; bis-(3-chloro-4-hydroxyphenyl)methane; 3-bromo-3'-chloro-bis(4-hydroxyphenyl)-methane; 1,1-bis-(3-bromo-4-hydroxyphenyl)ethane; 1,1-bis-(3-chloro-4-hydroxyphenyl)ethane; 3-bromo-3'-chloro-bis-(4,4'-hydroxyphenyl)ethane; 1,1'-bis-(3-bromo-4-hydroxyphenyl)propane; 1,1'-bis(3-chloro-4-hydroxyphenyl)propane; 1,1'-(3-chloro-3'-bromo-bis-[4,4'-hydroxyphenyl])propane; 2,2'-bis-(3-bromo-4-hydroxyphenyl)propane; 2,2'-bis-(3-chloro-4-hydroxyphenyl)propane; 2,2'-(3-bromo-3'-chloro-bis[4,4'-hydroxyphenyl])propane; as well as their alkali metal salts.

Preferred bisphenols are 2,2-bis-(3,5-dibromo-4-hydroxyphenyl)propane, also known as tetrabromobisphenol A, and 2,2-bis-(3,5-dichloro-4-hydroxyphenyl)-propane, also known as tetrachlorobisphenol A.

Many brominated bisphenols of the above-described structure are commercially available and may be prepared by the condensation of a lower alkyl ketone or aldehyde with two molecules of the phenol and subsequently brominating and/or chlorinating the unsubstituted phenol. This reaction is usually carried out with or without an inert solvent in the presence of an acid. This reaction is summarized in the case of X and Y being bromine in the following equations wherein R and R' have the meanings hereinabove described.

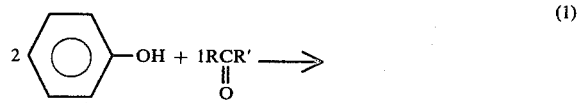
(1)

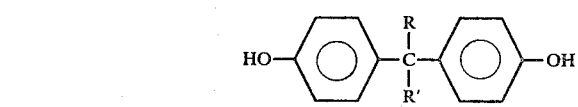

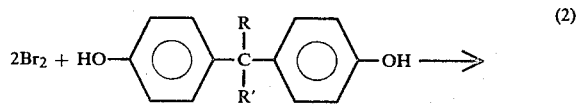
(2)

-continued

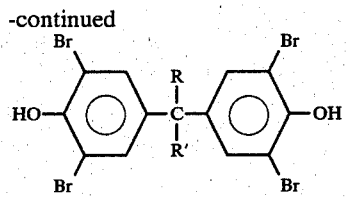

The solvent in which the bisphenol and catalyst or acid acceptor are dissolved and in which the reaction takes place should be inert and incapable of reacting with any of the components present therein. Furthermore, the solvent should be a solvent for both the starting materials as well as the resulting polymer. This allows the solvent to help maintain the forming polymer in a more workable form.

Suitable solvents which may be utilized in the solution polymerization technique described herein include chloroalkanes and aromatic and chloroaromatic compounds. Examples of such compounds include methylene chloride, chloroform, tetrachloroethane, trichloroethane, chlorobenzene, chlorotoluene, dichloroethane, benzene, toluene, and xylene.

The catalyst or acid acceptor is preferably a tertiary amine which is capable of undergoing a reaction with the bisphenol to form a complex salt. The bisphenol complex salt subsequently reacts with the diacid halide and liberates an amine halide.

Stoichiometric amounts of the bisphenol and the catalyst would require a ratio of the tertiary amine to the bisphenol of about 2:1. However, it has been found that in order for the reaction to proceed at a commercially acceptable rate, an excess of acid acceptor should be employed. The amount of excess acid acceptor is generally less than about 50, typically less than about 20, and preferably less than about 5% by weight based upon the stoichiometric amount of acid acceptor required. The upper limit of acid acceptor is not critical. However, it should be remembered that excess amounts of acid acceptor should be neutralized and the reaction product of the neutralization reaction should be separated from the final polymer product.

Representative examples of suitable tertiary amine catalysts or acid acceptors include triethylamine, diamino-2,2,2,bicyclo octane, tripropyl amine, dimethyl aniline, pyridine, dimethyl amine and benzyl amine. Triethylamine is a preferred acid acceptor.

It will be noted that the halogenated aromatic polyesters of this invention are prepared by the condensation of bisphenols with the diacid halides of isophthalic acid, terephthalic acid or mixtures thereof. The use of a diacid halide as opposed to other corresponding derivatives is important in that it is normally not possible to directly prepare these polymers from bisphenols and free acids. These acid halides may be derived from the corresponding dicarboxylic acids by any one of several methods well known in the art such as by reacting the respective acids with thionyl chloride. Thus, the diacid halide is preferably utilized in the form of a diacid chloride.

It is generally preferred to dissolve the diacid halide in the same type of solvent utilized to prepare the solution containing the halogenated bisphenol. Although this is not critical, the employment of a solvent provides for a more accurate control of the addition of the diacid halide to the bisphenol containing solution.

In preparing a preferred brominated aromatic polyester, the diacid halide will generally be utilized in the form of an aromatic acid chloride mixture of from about 45 to about 75%, preferably from about 55 to about 65% (e.g., 60%) by weight isophthaloyl chloride and correspondingly from about 55 to about 25%, preferably from about 45 to about 35% (e.g. 40%) by weight terephthaloyl chloride.

In preparing a preferred chlorinated aromatic polyester, the diacid halide will generally be utilized as an aromatic acid chloride mixture of from about 40 to about 90%, preferably from about 60 to about 80% (e.g., 70%) by weight isophthaloyl chloride, and correspondingly from about 60 to about 10%, preferably from about 40 to about 20% (e.g., 30%) by weight terephthaloyl chloride.

For smooth operation in a stirred solution, the resulting polymer product preferably should be about 10% or less on the basis of the total weight of the solvent although percentages as high as 25% may be utilized depending upon the molecular weight of the polymer.

Generally substantially stoichiometric amounts of each reactant are employed. Typical molar amounts of from about 1:0.9:0.1 to about 1:0.4:0.6, of the ratio of bisphenol, isophthaloyl chloride, and terephthaloyl chloride, respectively, may be utilized when preparing a chlorinated aromatic polyester. Typical molar amounts of from about 1:0.45:0.55 to about 1:0.75:0.25 of the ratio of bisphenol, isophthaloyl chloride, and terephthaloyl chloride, respectively, may be utilized when preparing a brominated aromatic polyester.

The polymerization reaction may be carried out in a batch, semi-continuous, or continuous manner, as desired. However, in a preferred embodiment, the reaction is carried out in a continuous manner, by which the reactants are continuously introduced into the reaction zone and the polymer product is continuously prepared and withdrawn. This may be achieved, for example, by utilizing a cylindrical tube, having static mixers as a reaction vessel. The bisphenol containing solution is passed through the tube while adding the diacid halide at various points along the longitudinal axis of the tube. Thus, the diacid halide is added in large amounts at the upstream portion of the tube and in gradually decreasing amounts at positions further downstream in the tube.

The final concentration of the polymer in solution is from about 3 to about 25%, typically from about 5 to about 20%, and preferably from about 7 to about 15%, by weight, of the total reaction mixture.

Polymerization is effected at temperatures which may vary from about 0 to about 200, typically from about 10 to about 100, and preferably from about 15° to about 50° C., and at corresponding autogenous pressures which are due to the vapor pressure of the solvent at the aforenoted temperatures which may vary from about 0.2 to about 26, typically from about 0.3 to about 4.8, and preferably from about 4.0 to about 1.4, atmospheres.

Agitation of the reactants should be sufficient to evenly disperse the diacid halide throughout the bisphenol containing solution to avoid a buildup of the concentration of the diacid halide in a localized area within the reaction mixture. Such agitation may be supplied by any of the standard means of mixing such as by stirrer, shaker, static mixer, spray nozzle or other flow agitating systems.

The present process typically employs reaction times of generally from about 0.1 to about 20, typically from about 1 to about 10, and preferably from about 2 to about 6, hours when conducted on a batch basis. Polymerization conducted on a continuous basis will typically employ shorter polymerization times depending on the degree of mixing.

At the conclusion of the polymerization reaction, the polymer solution which contains tertiary amine hydrochloride and unreacted tertiary amine preferably should be treated with hydrogen chloride to neutralize the unreacted tertiary amine. This hydrogen chloride may be in the form of an aqueous hydrochloric acid solution, or, in a preferred embodiment as disclosed in copending patent application U.S. Ser. No. 208,366, filed concurrently herewith by Albert G. Williams, entitled "Improved Process for Producing Halogenated Aromatic Polyesters", the hydrogen chloride may be introduced in the form of gaseous, substantially anhydrous, hydrogen chloride. The disclosure of the above-identified patent application is hereby incorporated by reference.

After the neutralization of the tertiary amine, the polymer solution containing the tertiary amine hydrochloride is subjected to the continuous countercurrent extraction of the present invention.

After neutralization the polymer (e.g., halogenated aromatic polyester) solution contains greater than about 0.5%, by weight, and typically from about 2.5 to about 3.5% (e.g., 3%), by weight, soluble (i.e. dissolved) tertiary amine hydrochloride and from about 1.5 to about 2.5% (e.g., 2%), by weight, based on the weight of the polymer solution, suspended tertiary amine hydrochloride.

The extraction columns useful in removing the water-soluble impurities from the viscous polymer containing solutions must be mechanically aided due to the large differences in density and viscosity between the polymer solution and water extractant. Such apparatus are well known to those skilled in this art. These apparatus include a Karr reciprocating plate column and a Scheibel rotating disk contactor.

The operation of the Karr reciprocating plate column will be described with reference to the accompanying figure. The Karr reciprocating plate column comprises a vertical pipe (20), adapted at both ends with caps which permit injection of the polymer solution and water, and fitted with a series of perforated Teflon TM coated plates (12), having about 62% free area in the form of holes, which are fastened to a central shaft (13) and which may be displaced vertically by an external drive system (14). Both stroke frequency and stroke length of the plate stack assembly can be varied by the drive system. The polymer solution is introduced through pipe (15) and the water (i.e., extractant) through pipe (6). The water containing the extract (i.e., water containing extracted tertiary amine hydrochloride) is removed through conduit (17) after passing through disengaging zone (11), and the raffinate (i.e., polymer solution from which tertiary amine hydrochloride has been extracted) through conduit (18). Prior to removal, the raffinate is collected in collection zone (11') defined by pipe (19) which is connected to pipe (20). This collection zone is a part of the column in which there are no oscillating plates. The purpose of this zone is to allow the discontinuous or dispersed phase to disengage from the continuous phase so that the dispersed phase may be removed.

In the present invention the water extractant which forms an aqueous phase is introduced at the bottom of the column and the polymer solution which forms an organic phase is introduced at the top of the column. The collection zone for the extractant is therefore at the top of the column.

Dispersal of the two fluids is accomplished by the energy provided by the oscillating plate stack.

Extraction efficiency when using a Karr Column or other apparatus similar thereto is dependent upon several factors including (1) concentration of the water-soluble impurities in the polymer solution, (2) the density of the polymer solution, (3) the viscosity of the polymer solution, (4) the height of the extraction column, (5) the identity of the discontinuous (i.e., dispersed) phase, (6) the ratio of the polymer solution and extractant (i.e., water) feed rates, (7) the energy input, e.g., the frequency and amplitude of the plates and (8) extraction temperature. Process variable 1 is fixed in the sense that it depends on procedures employed during polymerization and neutralization. Process variable 2 (i.e. density) is fixed in the sense that it is not actively controlled to improve extraction efficiency. The remaining process variables which are to be employed in the countercurrent extraction process are selected in a manner sufficient to preferably achieve the maximum extraction efficiency for the removal of the water soluble impurity, e.g., tertiary amine hydrochloride, from the polymer solution.

Extraction efficiency is herein defined as the balance achieved by the extraction process described herein between the concentration of the tertiary amine hydrochloride in the whole raffinate and the extract. Thus, while the primary goal of the countercurrent extraction process is to remove the tertiary amine hydrochloride from the polymer solution it is a secondary goal that the process variables of extraction be controlled in such a manner that the tertiary amine hydrochloride which is removed can be economically recovered. The economic recovery of the tertiary amine hydrochloride is primarily dependent on the concentration of this tertiary amine hydrochloride in the extract. If this concentration is too low, large volumes of extract must be processed to recover small amounts of the hydrochloride.

Extraction efficiency may be determined by analyzing the extract and whole raffinate (i.e., including emulsified water) for chloride ion concentration by titration with standard mercuric nitrate solution using a diphenyl carbazone indicator. It should be noted that the concentration of tertiary amine hydrochloride is approximately four times the chloride ion concentration based on the weight percent of chlorine in the tertiary amine hydrochloride.

In analyzing the chloride ion, sampling of the extract and whole raffinate is continued until equilibrium is established.

The above method of analysis for determining the chloride ion concentration relies on the principle that when a chloride ion (also bromide, if present) is titrated with mercuric nitrate it forms the slightly dissociated mercuric chloride. In an acid system and in the presence of diphenylcarbazone indicator, the endpoint is indicated by the formation of the wine-red complex of the indicator with the first excess of mercuric ions.

The reagents employed in this analysis are: (1) mercuric nitrate, either 0.020 N or 0.1 N; (2) saturated alcoholic solution of diphenylcarbazone indicator; (3) alcoholic nitric acid, 0.5 N; (4) standard sodium chloride solution, 0.0200 N; (5) aqueous solvent; and (6) 95/5 methylene chloride/methanol (MeCl$_2$/MeOH), by weight.

The procedure for determining chloride ion concentration in the whole raffinate is conducted by weighing out an appropriate size sample of the whole raffinate so that the titrant volume is about 0.5 to 5 ml. For well extracted polymer solutions this amounts to about 50 grams and requires titration with the 0.02 N titrant, while for feed stock only 2 grams would be needed and would be titrated with the 0.1 N reagent. To this sample is added 300 ml. of the 95/5 solvent, 10 drops of indicator, and 10 drops of alcoholic nitric acid 0.5 N. The sample is then stirred until homogeneous and then titrated with appropriate strength mercuric nitrate solution. For high chloride ion solutions, solvent blank may be neglected. For well extracted polymer solutions a solvent blank must be run and the volume of titrant subtracted from the volume used in the sample titration.

The aqueous extract is titrated in a similar manner by using an appropriate sample size usually about 1 gram and diluting it to 50 ml. with chloride free distilled water and titrating with 0.1 N mercuric nitrate titrant.

The density of the polymer solution after polymerization must have a density greater than 1 to enable it to fall through water and is generally from about 1.30 to about 1.40 gms/cc., typically from about 1.33 to about 1.36 gms/cc. (e.g., 1.35 gms/cc). The density of the polymer solution is generally not actively controlled to improve extraction efficiency but it may be passively affected when other process variables are selectively controlled such as by dilution of the polymer solution to achieve a desired viscosity.

The viscosity of the organic phase, i.e., polymer solution, employed in a Karr Column is limited in part by its ability to flow through the column. Thus, a polymer solution having a viscosity of greater than about 300 poise (as determined by a Brookfield viscometer) has been found to be too viscous to flow through a 1 inch Karr column. Therefore, an upper limit is established for the molecular weight/polymer concentration combination, i.e., if the molecular weight is decreased, the concentration of polymer in the polymerization mixture can be increased up to a maximum which yields a viscosity of about 300 poise. This limit of about 300 poise on the viscosity of the polymer solution is expected to remain substantially unchanged regardless of the diameter of the column.

Typically, when a Karr column or other similar apparatus is employed polymer solution viscosities are controlled to be not greater than about 300 poise and can vary from about 10 to about 300 poise (e.g., 10 to 250 poise), typically from about 15 to about 100 poise and most preferably from about 30 to about 60 poise as determined by a Brookfield viscometer. The viscosity of the polymer solution can be controlled simply by controlling the concentration of the polymer in the solution by dilution with an appropriate solvent or by concentrating the solution if needed.

Polymer solution viscosities below 10 poise are not employed since it is very rare that the polymer solution after polymerization would be below 10 poise and it would be uneconomical to dilute the polymer solution to such an extent that the solution viscosity falls below this value. More importantly, however, it has been found that at solution viscosities below about 10 poise the solution emulsifies and cannot be extracted.

The ratio of the flow rates of the organic phase and the aqueous phase is one of the primary factors which affects the concentration of the tertiary amine hydrochloride in the whole raffinate and the extract. Thus, under a given set of conditions as the flow rate of the organic phase is increased relative to the flow rate of aqueous phase the extent of the removal of the tertiary amine hydrochloride is decreased while the concentration of the hydrochloride in the extract is increased. Conversely, as the flow rate of organic phase relative to the aqueous phase is decreased (e.g., to about 1:1) the extent of the removal of the tertiary amine hydrochloride from the organic phase is increased while the concentration of the hydrochloride in the extract is decreased.

Consequently, the balance between the relative flow ratio of the organic phase to aqueous phase is preferably controlled in such a manner that not only is the tertiary amine hydrochloride efficiently removed from the organic phase but also the concentration thereof in the extract is high enough to be efficiently removed therefrom.

Because of the higher viscosity of the continuous organic phase, the flow rate thereof is generally selected to be the maximum permissible without flooding the column. For the 1" column, with a polymer solution (organic phase) viscosity of 54 poise the preferred flow rate for the polymer solution is 20 cc/min which represents a 6.3 cm/min downward plug flow velocity. Generally the volume ratio of flow rates (cc/min) for the organic phase to aqueous phase varies from about 2:1 to about 10:1 and typically from about 5:1 to about 10:1 and most preferably from about 6:1 to about 9:1 (e.g. 9:1).

A further way in which the movement of the organic phase can be characterized is by downward plug flow velocity which is the volumetric flow rate of the downward moving phase per unit cross sectional area of the column. In expressing the downward plug flow velocity the assumption is made that the downward moving phase, e.g., organic phase, moves as a single mass with uniform velocity.

The downward plug flow velocity will be a function of the dope viscosity, the column diameter, the design of the agitator, and energy input. Accordingly, downward plug flow velocity can vary from about 0.1 to about 20 cm/min, preferably from about 1 to about 10 cm/min most preferably from about 3 to about 8 cm/min.

As described above, at a fixed stroke length (e.g. 2.0 cm) the extraction of the tertiary amine hydrochloride from the polymer solution is increased by increasing the water flow rate. However, this relationship interacts with stroke frequency so that the enhancement of the extraction process by increasing the water flow rate is more pronounced at mid-frequencies (e.g., 100 to 200 strokes per minute) than at low frequencies (e.g. 10 to 100 s.p.m.). For a 1" diameter Karr column employing water as the discontinuous phase the water flow rate can vary from about 2 to about 10 cc/min, and preferably from about 2 to about 5 cc/min.

Since mechanical agitation is required to break the polymer solution into droplets to increase their surface area and thereby increase the rate of diffusion of the tertiary amine hydrochloride into the aqueous phase, the aqueous phase will also be present in the column as small droplets. The velocities of the organic and aqueous phases can be controlled by manipulating certain process variables.

The velocity of the organic phase down the extraction column can be increased by reducing its viscosity. As the downward velocity of the organic phase is increased, one would generally expect that the water droplet size (i.e., diameter) of the aqueous phase necessary to achieve an upward flow counter to the organic phase would have to be increased, thus reducing the efficiency of the tertiary amine hydrochloride removal from the organic phase (lower surface area in contact with the continuous organic phase). Assuming no net effect of the agitator on the relative velocities of the two phases, the water droplets of the aqueous phase must have an upward velocity not less than, and preferably greater than the downward plug flow velocity of the organic phase.

Based on calculations from Stokes law, and ignoring hydrostatic head, the average water droplet diameter can be controlled, by varying the input energy to the column, to be at least 5.4 mm. when the polymer solution viscosity is, for example, 54 poise, to achieve the minimum upward velocity to the aqueous phase. However, a reduction in the organic phase viscosity from 54 poise, for example, does not necessitate an increase in the water droplet size due, it is believed, to the fact that the velocity of the water droplet, based only on Stokes law, is also inversely related to the viscosity of the organic phase. Thus, the relative velocities of the organic phase and the water droplets of the aqueous phase are independent of the viscosity of the organic phase. The net effect is that for a given height column, reducing the viscosity of the organic phase (e.g., below 54 poise) will permit maintenance of the same contact time and surface area of the water droplets as would be employed using a polymer solution having a higher viscosity (e.g., 54 poise).

Consequently the minimum water droplet diameter which permits the aqueous phase to travel upward at the required velocity for any polymer solution having a viscosity below 300 poise is about 5.4 mm. regardless of the particular polymer solution viscosity selected below 300 poise. This makes it possible to achieve efficient extraction over a wide range of polymer solution viscosities.

Typically, there are other factors, however, such as (1) the interaction of water droplets with each other, (2) the perturbing of the polymer solution flow field of concentrated suspensions causing additional drag, and (3) the reduced density differences between organic-/aqueous phases, which will require a larger average water droplet diameter to achieve a water velocity greater than or equal to the plug flow velocity of the polymer solution stream. Since the water droplet size is a function of energy input it is controlled for example by varying stroke length and frequency as discussed herein.

Increasing the height of the extraction column will generally increase extraction efficiency, while increasing the diameter of the column will increase production by making it possible to process more polymer solution over a given period. A commercial Karr column for use in the present invention typically will have a height of about 18 feet and a plate diameter of about 12 inches. A plate diameter of about 12 inches allows for the potential negative column wall effects. However, any other combination of column height and diameter can be used depending on the production rate, final raffinate and extract qualities desired.

Generally, the polymer solution can be present during extraction as either the continuous or the discontinuous phase. However, extraction efficiency is greatly increased by selecting the polymer solution as the continuous phase wherein the extractant (i.e., water) is introduced at the bottom of the extraction column and the water droplets are allowed to rise through the polymer solution. This procedure provides a much longer residence time for both phases in the column. Thus, although the density difference between the two phases remains the same, and the force on a given droplet to traverse the continuous phase is essentially the same, this force must work against the polymer solution viscosity which results in a very slow ascent for the water compared to the relatively rapid descent observed for the polymer solution.

The polymer solution can be selected as the continuous phase by filling the column first with this solution and subsequently introducing the water. Conversely, the column is initially filled with water if it is desired to select water as the continuous phase.

In general, higher stroke frequencies at a given stroke length lead to increased extraction of tertiary amine hydrochloride. At the lowest water flow rates (e.g., 2 cc/min), wherein water is the discontinuous phase, the maximum frequency (e.g., 390 s.p.m.) is preferred to reduce the levels of chloride to 10 ppm or less. For a stroke frequency of 150 s.p.m., at a stroke length of 2.0 cm., chloride levels in the whole raffinate below 50 ppm are generally not attainable regardless of the water flow rate.

Stroke frequencies typically can vary from about 10 to about 390 s.p.m., and preferably from about 50 to about 150 s.p.m.

Generally, the larger the stroke length at a given stroke frequency the greater the extraction of the tertiary amine hydrochloride. Under typical conditions described herein the stroke length of a 1" diameter Karr column can vary from about 1.5 to about 3.0 cm in order to reduce the chloride content of the polymer solution to less than about 50 ppm.

As a result of the energy input to the Karr column via the plate stack agitator (in essence creating alternately high and low pressure zones in the column) the temperature at the top of the column (i.e., point of introduction of the polymer solution as the continuous organic phase) tends to rise (e.g., to about 40° C.) and vaporize the solvent (e.g. methylene chloride). When this occurs, the polymer solution laden with solvent vapor becomes lighter than the water and rises to the extraction outlet to render the column inoperative. Furthermore, increasing the temperature of the contents of the extraction column leads to increased emulsification of water in the whole raffinate thereby reducing extraction efficiency.

Consequently, to avoid these problems it is necessary to control the temperature of the polymer solution (organic phase) and water extractant (aqueous phase) inside the column in a manner sufficient to control vaporization of the polymer solvent of the organic phase to the extent that the organic phase does not become lighter than the aqueous phase and travel in a direction concurrently therewith. Typically the temperature will be controlled to be not greater than about 32° C. Temperatures above this have been found to render the column inoperative when the polymer solvent employed is methylene chloride. Typically the temperature of the extraction column contents when methylene chloride solvent is present will be controlled to be from about 10° to about 32° C., preferably from about 15° to about 25° C., and most preferably from about 20° to about 23° C. Generally, the extraction efficiency is inversely proportional to extraction temperature.

Temperature control can be achieved by enclosing the extraction column in a water jacket.

As indicated above, the chloride levels discussed herein in terms of limits or goals for controlling the process variables to improve the overall extraction efficiency are measured for the whole raffinate (i.e., including emulsified water) and for the extract.

Generally, the amount of water in the whole raffinate increases as the energy input to the column is increased. Typically, the raffinate will contain between about 1.0 and about 10%, preferably from about 1 to about 6%, and most preferably from about 1 to about 3%, by weight thereof, of water, usually in emulsified form. For subsequent processing efficiency the water content of the whole raffinate should be reduced to below the solubility limits of the concentrated (e.g. 20% by weight thereof) polymer solution (e.g., below about 0.9% by weight, based on the weight of the whole raffinate). Consequently, the raffinate is preferably treated to remove an appropriate amount of water therefrom prior to concentration of the raffinate.

Water removal from the raffinate can be achieved by centrifugation under relatively mild conditions, or by passing the raffinate through a hydrophilic filter wherein the dispersed water is agglomerated and settles out so it can be decanted.

It is to be understood that the process parameters of polymer solution viscosity, energy input (e.g., stroke frequency and stroke length), polymer solution-extractant feed rate ratio, temperature of extractant column contents, and identity of the discontinuous phase are selected and balanced in a manner sufficient to obtain a chloride ion content in the whole raffinate of not greater than about 500 ppm, and generally from about 500 to about 7 ppm, typically from about 300 to about 7 ppm, and most preferably from about 100 to about 7 ppm. Additionally, the balance in properties is further preferably selected in a manner sufficient to obtain a chloride ion content in the extract of from about 0.8 to about 20%, preferably from about 1 to about 15%, and most preferably from about 2 to about 12.5%, by weight, based on the weight of the extract.

A Scheibel liquid-liquid extraction column may also be used in the process of the present invention. Such columns are well known to those skilled in this art. A Scheibel column useful in the present invention is disclosed in U.S. Pat. No. 3,389,970.

After removal of the water-soluble impurities, the halogenated aromatic polyester may be recovered in any suitable manner such as evaporation of the solvent or by precipitation of the polymer in a suitable non-solvent such as acetone or methanol. The polymer may then be isolated in solid form and dissolved in a suitable solvent at a concentration sufficient to achieve the desired spinning dope viscosity or concentrated without isolation to the desired spinning dope viscosity by employing the method disclosed in copending patent application U.S. Ser. No. 208,202, entitled "Flash Evaporation Process for Concentrating Polymer Solutions", filed concurrently herewith by Albert G. Williams, and thereafter processed for shaping. The disclosure of this patent application is hereby incorporated by reference.

The halogenated aromatic polyesters prepared by the process of the presently claimed invention may be dissolved in a suitable spinning or casting solvent, such as methylene chloride or tetrahydrofuran and formed into a shaped article, such as a fiber or film.

The inherent viscosity of the polymer is determined by measuring the relative viscosity of a 0.1% solution of the polymer at 25° C. in a suitable solvent, such as chloroform or a 10/7 (w/w) mixture of phenol/trichlorophenol. The viscosity of the polymer solution is measured relative to the solvent alone and the inherent viscosity (I. V.) is determined from the following equation:

$$I.V. = \frac{\ln\left(\frac{V_2}{V_1}\right)}{C}$$

In the above formula, $V_2$ is the efflux time of the solution, $V_1$ is the efflux time of the solvent, and C is the concentration expressed in grams of polymer per hundred milliliters of solution.

The halogenated aromatic polyesters of the present invention will exhibit an inherent viscosity (I. V.) of generally about 0.4 to about 1.7, typically from about 0.6 to about 1.5, and preferably from about 0.7 to about 1.2 deciliters per gram which are indicative of polymers having a weight average molecular weight of from about 25,000 to about 150,000, typically from about 40,000 to about 123,000, and preferably from about 50,000 to about 97,000.

The halogenated aromatic polyesters described herein have been used to produce a number of inherently nonburning fibrous materials which are particularly advantageous when fibrous articles are required for use in fire-control environments, such as children's sleepwear, suits for fire fighters, hospital furnishings, and uniforms for military and civilian personnel.

The following Examples are given as illustrations of the claimed invention. It should be understood, however, that the invention is not limited to the specific details set forth in the Examples. All parts and percentages in the Examples as well as in the remainder of the specification are by weight unless otherwise specified.

EXAMPLE 1

Two hundred one and seven-tenths parts by weight tetrabromobisphenol A, 45.2 parts by weight isophthaloyl chloride and 30.1 parts by weight terephthaloyl chloride are reacted to form a brominated aromatic polyester in the presence of about 2600 parts by weight methylene chloride solvent and 77.3 parts by weight triethylamine acid acceptor.

The contents of the reaction zone are heated at atmospheric pressure at about 40° C. with agitation for 3 hours.

When the reaction is complete, substantially anhydrous hydrogen chloride is bubbled through a gas sparge into the solution for five minutes until the excess triethylamine is neutralized as determined by measuring the pH of the solution. The excess triethylamine is neutralized when the pH is reduced to below about 3.0. The pH is measured by determining the pH of the water layer of a mixture which is prepared by mixing 50% by weight reaction solution with 50% by weight distilled water.

The brominated aromatic polyester possesses the structural formula heretofore illustrated where X and Y are bromine groups, R and R' methyl groups, and n is about 50. The brominated aromatic polyester has a bromine content of about 48 percent by weight, a melting point of about 265° C., and an inherent viscosity of about 0.8 deciliters per gram measured at a concentration of 0.1 percent by weight in a solvent which is a mixture of 10 parts by weight of phenol and 7 parts by weight trichlorophenol.

EXAMPLE 2

This Example illustrates the effects of column energy input and flow rates of the polymer solution (i.e., dope) and water on extraction efficiency. Note that the term "dope" refers to the polymer solution as it enters the extraction column. This is to be distinguished from "whole raffinate" which refers to the polymer solution after it leaves the extraction zone of the column but before removal of emulsified water.

Thus, the polymer solution prepared in accordance with Example 1 in methylene chloride in an amount of 10% by solution weight and having a density of 1.35 gm/cc and a solution viscosity of 54 poise is introduced at the top of a Karr column as the discontinuous organic phase and fresh water is introduced at the bottom of the column as the continuous phase. The frequency and amplitude of the plates is varied as indicated at Table I and the temperature of the column contents are maintained at 25° C. Extraction efficiency is determined by analyzing the extract and whole raffinate for chloride ion by titration with standardized mercuric nitrate solution with diphenylcarbazone as indicator. The column is an 8-foot high, fully jacketed, 1-inch diameter Karr reciprocating plate column with a maximum plate stack frequency of 390 strokes per minute and a plate spacing of 2.5 cm.

When the raffinate leaves the column, it appears emulsified, so it is centrifuged to determine its separability and its water content. To determine the water content, the chloride ion content of the centrifuged raffinate (i.e., emulsified water removed), water layer from the centrifuged raffinate, as well as the whole raffinate (includes emulsified water) are ascertained and the water content calculated based on a chloride balance. The water content is remarkably similar for each run.

triethylamine hydrochloride (e.g., approximately 4× the $Cl^-$ concentration in ppm divided by 10,000). When the stroke length is increased to 3.5 cm., the column floods. Little effect was had on the extraction efficiency when the polymer solution to water ratio and the total flow rate were varied.

It should be noted that in Run 3, the concentration of triethylamine hydrochloride in the extract is almost 37% by weight. Because of this high triethylamine hydrochloride concentration, the recovery of triethylamine, a step necessary to enhance the economics of the overall process of preparing the polymer, is facilitated.

Runs 7 and 8 indicate that when a polymer solution containing only 4% (rather than 8%) polymer by weight in methylene chloride is introduced into an extraction column which has a frequency of 288 strokes per minute, the extraction is improved. The concentration of triethylamine hydrochloride in the raffinate is only about 0.3% in Runs 7 and 8 compared with approximately 1.2% in Runs 1 through 5. However, increased polymer solution dilution also increases the volume of the polymer solution the column must handle.

In Runs 1 through 8, it is noted that the polymer solution is dispersed as small droplets in the water phase, but that the droplets drop through the column fairly rapidly. The residence time is longer than that which would be obtained in a spray-type column without agitation, but is insufficient to allow substantially complete diffusion of the triethylamine hydrochloride through the polymer solution droplet to the surface where it is rapidly removed by the water. Increasing the energy input to the column to break up the polymer solution into even finer droplets is limited because of the tendency of the two phases to emulsify and flood the column.

EXAMPLE 3

Example 2 is repeated except that the polymer solution (i.e. dope) is introduced at the top of the column as the continuous phase and the water is introduced at the bottom of the column as the discontinuous phase. Runs are conducted using variable water extractant flow rates; stroke frequencies; and stroke lengths. The results of these Runs are summarized at Tables II to IV.

As may be seen from the data of Tables II to IV, the

TABLE I

Extraction Efficiency of KARR Column - Water Continuous Phase

| Run No. | Dope Feed Rate, cc/min. | H₂O Feed Rate, cc/min. | Stroke Length, cm. | Cl⁻ ion Content ppm in Whole Raffinate | Extract | C.R. | H₂O from C.R. | Calc. H₂O in whole Raff. %[1] | TEA.HCL in EXTR %[2] |
|---|---|---|---|---|---|---|---|---|---|
| A: Dope Diluted to 8% Polymer by wt. Plate Stack Frequency 390 Strokes/Minute | | | | | | | | | |
| 1 | 40 | 20 | 1.7 | 3020 | 33,600 | 696 | 73,100 | 3.2 | 13.0 |
| 2 | 40 | 40 | 1.7 | 2700 | 13,100 | 671 | 66,900 | 3.1 | 5.1 |
| 3 | 80 | 10 | 1.7 | 3130 | 95,200 | 436 | 56,700 | 4.8 | 36.9 |
| 4 | 80 | 20 | 1.7 | 3580 | 65,400 | ND | ND | ND | 25.3 |
| 5 | 80 | 40 | 1.7 | 2750 | 21,500 | 492 | 60,300 | 3.8 | 8.3 |
| 6 | 80 | 40 | 3.5 | COLUMN FLOODED | | | | | |
| B: Dope Diluted to 4% Polymer by wt. Plate Stack Frequency: 288 Strokes/Minute | | | | | | | | | |
| 7 | 40 | 20 | 1.7 | 730 | 24,000 | 252 | 5,370 | 9.3 | 9.3 |
| 8 | 80 | 20 | 1.7 | 672 | 42,200 | ND | ND | ND | 16.3 |

ND = not determined
TEA.HCl = Triethylamine hydrochloride
C.R. = Centrifuged raffinate
[1]% by weight based on the weight of whole raffinate
[2]% by weight based on the weight of extract As can be seen from Table I, it is apparent that at high frequencies (390 strokes per minute) and a midlength stroke (1.7 cm), the whole raffinate contains about 1.2% extraction of the tertiary amine hydrochloride is increased by increasing the stroke frequency, water feed rate, and stroke length (i.e., displacement of column plates). However, as the energy input increases (i.e., increasing stroke frequency and stroke length) the amount of water in the whole raffinate increases.

TABLE II
KARR COLUMN EFFICIENCY - DOPE/WATER VOLUME FLOW RATE RATIO 10:1

| Column Height: | 8 ft. Plate Stack |
|---|---|
| [1]Dope Feed Rate: | 20 cc/min. |
| Water Feed Rate: | 2 cc/min. |
| Column Diameter: | 1 inch |
| Continuous Phase: | Dope |
| Dispersed Phase: | Water |
| Extraction temp: | 25° C. |
| Dope Polymer Conc: | 9.6% |
| Dope Viscosity: | 50 poise |

| Run No. | Frequency s.p.m.[2] | Whole Raffinate | Cl$^-$ion Content ppm in Extract | C.R.[3] | $H_2O$ from C.R. | Calc. $H_2O$ in Raff. %[4] |
|---|---|---|---|---|---|---|
| A. STROKE LENGTH: 2.0 cm. ||||||||
| 1 | 171 | 331 | 144,900 | 14 | 10,600 | 3.0 |
| 2 | 300 | 57 | 149,100 | 3.5 | 1,500 | 3.6 |
| 3 | 380 | 9.7 | 122,100 | 1.3 | 245 | 3.5 |
| B. STROKE LENGTH: 1.0 cm. ||||||||
| 4 | 300 | 291 | 151,800 | 9.3 | 7,900 | 3.6 |

[1]Dope = polymer solution as it enters extraction column
[2]s.p.m. = strokes per minute
[3]C.R. = centrifuged raffinate
[4]% by weight based on whole raffinate

TABLE III
KARR COLUMN EFFICIENCY DOPE/WATER VOLUME FLOW RATE RATIO 6.7/1

| Column Height: | 8 ft. Plate Stack |
|---|---|
| [1]Dope Feed Rate: | 20 cc/min. |
| Water Feed Rate: | 3 cc/min. |
| Column Diameter: | 1 inch |
| Continuous Phase: | Dope |
| Dispersed Phase: | Water |
| Extraction Temp. | 25° C. |
| Dope Polymer Conc: | 9.6% |
| Dope Viscosity: | 50 poise |

| Run No. | Plate Stack Frequency s.p.m.[2] | Stroke, Length, cm. | Whole Raffinate | Cl$^-$ion Content, ppm in Extract | C.R.[3] | $H_2O$ from C.R. | Calc. $H_2O$ in Whole Raff. %[4] |
|---|---|---|---|---|---|---|---|
| 1 | 99 | 1.0 | 283 | 84,900 | 16 | 13,300 | 2.0 |
| 2 | 99 | 2.0 | 213 | 105,800 | 6.9 | 4,520 | 4.6 |
| 3 | 171 | 0.5 | 271 | 89,500 | 34. | 20,800 | 1.1 |
| 4 | 171 | 1.0 | 113 | 110,000 | 5.8 | 3,030 | 3.6 |
| 5 | 171 | 2.0 | 25 | 91,600 | 1.5 | 695 | 3.4 |
| 6 | 171 | 3.5 | 10 | 112,500 | 0.7 | 118 | 4.1 |
| 7 | 300 | 0.5 | 133 | 100,700 | 12. | 5,710 | 2.2 |
| 8 | 300 | 1.0 | 67 | 99,300 | 1.7 | 1,580 | 4.1 |
| 9 | 300 | 2.0 | 12 | 97,800 | 1.3 | 213 | 5.4 |
| 10 | 300 | 3.5 | 16 | 91,200 | 1.1 | 194 | 7.8 |

[1]Dope = polymer solution as it enters extraction column
[2]s.p.m. = strokes per minute
[3]C.R. = Centrifuged Raffinate
[4]% by weight based on weight of whole raffinate

TABLE IV
KARR COLUMN EFFICIENCY - DOPE/WATER VOLUME FLOW RATE RATIO 4:1

| Column Height: | 8 ft. |
|---|---|
| [1]Dope Feed Rate: | 20 cc/min. |
| Water Feed Rate: | 5 cc/min. |
| Plate Stack Travel: | 2 cm. |
| Column Diameter: | 1 inch |
| Continuous Phase: | Dope |
| Dispersed Phase: | Water |
| Extraction Temp: | 25° C. |
| Dope polymer conc: | 9.6% |
| Dope Viscosity: | 50 poise |

| Run No. | Plate Stack Freq. s.p.m.[2] | Whole Raffinate | Cl$^-$ion Content ppm in Extract | C.R.[3] | $H_2O$ from C.R. | Calc. $H_2O$ in whole Raff. %[4] |
|---|---|---|---|---|---|---|
| 1 | 32 | 536 | 57,600 | 82 | 25,100 | 1.8 |
| 2 | 99 | 210 | 70,200 | 3.7 | 1,480 | 6.0 |
| 3 | 171 | 15 | 73,400 | 0.4 | 261 | 5.6 |
| 4 | 300 | 7.3 | 76,100 | 0.9 | 188 | 3.4 |

[1]Dope = polymer solution as it enters extraction column
[2]s.p.m. = strokes per minute
[3]C.R. = Centrifuged raffinate
[4]% by weight based on weight of whole raffinate

EXAMPLE 4

Example 3 is repeated with the exception that the polymer solution (i.e., dope) viscosity is varied by sampling a run in the middle (i.e., Run 2) and at completion of the polymerization (i.e., Runs 1 and 3). The results are summarized at Table V.

TABLE V
EFFECT OF DOPE VISCOSITY ON EXTRACTABILITY

Column Operating Conditions:

| Dope: | Feed Rate - 20 cc/min |
|---|---|
| | Concentration - |
| | 10% Polymer by wt. on dope |
| | TEA.HCL content - |
| | 5% by wt. on dope |
| Water: | Feed Rate: - 5 cc/min. |
| Plate Stack: | Stroke Frequency - |
| | 300 strokes per minute |
| | Stroke Displacement - 2 cm. |
| | Plate Spacing - 2.54 cm. |
| Column: | Karr reciprocating plate, 2.54 cm. |
| | I.D. glass, fully jacketed |
| Extraction Temperature: | 25° C. |

| | | Cl$^-$ ion Content, ppm in | | | Water Content |
|---|---|---|---|---|---|
| Run No. | Dope Visc., Poise | Whole Raffinate | C.R. | $H_2O$ from C.R. | of Whole Raffinate % by Wt. Analytical |

TABLE V-continued
EFFECT OF DOPE VISCOSITY ON EXTRACTABILITY

| 1 | 38  | 50 | 11 | 642 | 3.5 |
|---|-----|----|----|-----|-----|
| 2 | 4.2 | UNEXTRACTABLE - EMULSIFIES ||||
| 3 | 67  | 23 | 8  | 794 | 2.5 |

As may be seen from the data of Table V, extraction efficiency is reduced at lower viscosities and emulsification occurs at a polymer solution viscosity of about 4 poise.

EXAMPLE 5

This example illustrates the effect of varying extraction temperature on extraction efficiency.

Accordingly, Example 3 is repeated and the stroke frequency and extraction temperature are varied using a water jacketed Karr column. The pressure is atmospheric. The lower temperature limit is set by the availability of chilled water at 15° C. making an operating temperature of 18° C. feasible. The polymer solution employed in each Run was kept in a freezer at −10° C. until ready for use to minimize degradation. Maximum exposure of the polymer solution to room temperature during each Run is 7 hours.

The process conditions and results are summarized at Table VI.

TABLE VI
EFFECT OF EXTRACTION TEMPERATURE ON EXTRACTION EFFICIENCY

Karr Column: 8 ft. Plate Stack, 1" Dia.  
Stroke Length: 2 cm.  
Dope Feed Rate: 20 cc/min.  
Water Feed Rate: 3 cc/min.  
Polymer solution Viscosity: 54 poise

| Stroke Frequency (s.p.m.) | Temperature °C. | 18° C. | | 25° C. | | 32° C. | | 34° C. |
|---|---|---|---|---|---|---|---|---|
| 210 | | WR: | 949 | WR: | 1,953 | WR: | 1,734 | Column Inoperable |
|  | | CR: | 58 | CR: | 75 | CR: | 94 | |
|  | | CR-H₂O: | 17,700 | CR-H₂O: | 29,000 | CR-H₂O: | 30,300 | |
|  | | EXTR: | 125,000 | EXTR: | 131,000 | EXTR: | 132,000 | |
|  | | H₂O in R: | 5.3 | H₂O in R: | 5.3 | H₂O in R: | 5.5 | |
| 250 | | WR: | 164 | WR: | 1,296 | WR: | 1,144 | |
|  | | CR: | 16 | CR: | 41 | CR: | 52 | |
|  | | CR-H₂O: | 4,288 | CR-H₂O: | 18,800 | CR-H₂O: | 20,900 | |
|  | | EXTR: | 128,000 | EXTR: | 135,000 | EXTR: | 122,000 | |
|  | | H₂O in R: | 3.8 | H₂O on R: | 5.3 | H₂O in R: | 5.4 | |
| 300 | | WR: | 166 | WR: | 1,296 | WR: | 840 | |
|  | | CR: | 9 | CR: | 22 | CR: | 46 | |
|  | | CR-H₂O: | 4,656 | CR-H₂O: | 7,700 | CR-H₂O: | 16,000 | |
|  | | EXTR: | 114,000 | EXTR: | 139,000 | EXTR: | 130,000 | |
|  | | H₂O in R: | 3.7 | H₂O in R: | 4.6 | H₂O in R: | 4.7 | |

Key:  
Values refer to ppm. Cl⁻ ion in the:  
Wr = Whole Raffinate;  
CR = Centrifuged Raffinate  
CR-H₂O = Water from Centrifuged Raffinate;  
EXTR = Extract;  
H₂O in R = % by weight water in the Whole Raffinate by analysis.

As may be seen from Table VI extraction of the tertiary amine improves as the extraction temperature is lowered. In view of the low viscosity of the polymer solution and its proclivity to emulsify, the results are particularly good. Chloride ion levels below 10 ppm in the dope layer from the centrifuged raffinate are obtained. Again, the effect of increased energy input (300 s.p.m. vs. 210 s.p.m. plate stack frequency) to improve the extraction is shown. The effect is consistent at all temperatures. The water content of the raffinate from this dope appears to be independent of the energy input, but still at a level that requires further reduction prior to concentration.

The extract from all runs contains about 130,000 ppm chloride ion which is equivalent to about 50% TEA . HCl by weight of the extract. Regeneration of the Triethylamine (TEA) from the TEA . HCl followed by appropriate processing such as decantation, and methylene chloride extraction of the aqueous sodium chloride layer, if necessary, from this concentrated solution of TEA . HCl may be employed.

As the temperature is reduced from 32° C. there is a continuous reduction in the chloride ion content of the raffinate. This is reflected by the reduction in the chloride ion concentration in the water layer centrifuged from the raffinate and the concomitant chloride reduction in the raffinate in equilibrium therewith, as well as the reduction in the amount of water trapped in the raffinate. Although the water level is reduced, mechanical separation prior to dope concentration is preferred.

Although the invention has been described with preferred embodiments, it is to be understood that variations and modifications may be resorted to as will be apparent to those skilled in the art. Such variations and modifications are to be considered within the purview and scope of the claims appended hereto.

What is claimed is:

1. A continuous countercurrent extraction process for removing a tertiary amine hydrochloride from a water immiscible solution of a halogenated aromatic polyester, said tertiary amine hydrochloride being dissolved in said water immiscible solution in an amount of greater than about 0.5% by weight, which comprises:
    (a) introducing a water immiscible solution, having a viscosity of at least about 10 poise and not greater than about 300 poise and a density of greater than about 1.0 gm/cc., of a halogenated aromatic polyester of the recurring structural formula:

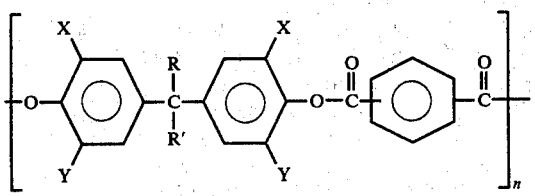

where X which may be the same or different is chlorine or bromine, Y which may be the same or different is hydrogen, chlorine or bromine, R and R' may be the same or different and represent lower alkyl groups, hydrogen, or together constitute a cyclic hydrocarbon group, and n=at least 10, at the top of an extraction column and introducing water at the bottom of said column to form a twophase mixture comprising an organic phase and an aqueous phase with each pahse flowing in counter current directions;

(b) controlling the volume ratio of the flow rates of the organic phase to aqueous phase to be from about 2:1 to about 10:1;

(c) mechanically agitating said mixture in a manner sufficient to (1) permit the aqueous phase to travel at an upward velocity of not less than the relative downward velocity of organic phase and (2) extract said tertiary amine hydrochloride from the organic phase in an amount sufficient to yield a whole raffinate having a chloride ion content of not greater than about 500 ppm; and (d) maintaining the two phases during extraction at a temperature sufficiently low so that the polymer solvent of the organic phase does not vaporize to an extent sufficient to render the organic phase lighter than the aqueous phase and thereby have it travel in a direction concurrently therewith.

2. The process of claim 1 wherein the aqueous phase is a discontinuous phase.

3. The process of claim 2 wherein the water immiscible polymer solution has a viscosity of from about 10 to about 250 poise.

4. The process of claim 2 wherein the extraction column is a Karr column, the tertiary amine hydrochloride is dissolved in the water immicible solution in an amount of from about 2.5 to about 3.5% by weight, the solvent of the organic phase is methylene chloride, the ratio of the flow rates of the organic phase to the aqueous phase is about 5:1 to about 10:1, and the temperature of the contents of the extraction column is controlled to be not greater than about 32° C.

5. The process of claim 2 wherein the temperature of the contents of the extraction column is controlled to be from about 15° to about 25° C.

6. The process of claim 2 wherein the chloride ion content of the whole raffinate is from about 500 to about 7 ppm.

7. The process of claim 2 wherein the tertiary amine is triethylamine hydrochloride.

8. The process of claim 2 wherein said halogenated aromatic polyester of the recurring structural formula is a product of tetrabromobisphenol A and a mixture of about 45 to about 75% by weight isophthaloyl chloride and correspondingly about 55 to about 25% by weight terephthaloyl chloride.

9. The process of claim 2 wherein said halogenated aromatic polyester of the recurring structural formula is a product of tetrabromobisphenol A and a mixture of about 60% by weight isophthaloyl chloride and correspondingly about 40% by weight terephthaloyl chloride.

10. The process of claim 2 wherein said halogenated aromatic polyester of the recurring structural formula is a product of tetrachlorobisphenol A and a mixture of about 90 to about 40% by weight isophthaloyl chloride and correspondingly about 10 to 60% by weight terephthaloyl chloride.

11. The process of claim 2 wherein said halogenated aromatic polyester of the recurring structural formula is a product of tetrachlorobisphenol A and a mixture of about 70% by weight isophthaloyl chloride and correspondingly about 30% by weight terephthaloyl chloride.

12. A continuous counter current extraction process for removing a tertiary amine hydrochloride from a water immiscible solution of a halogenated aromatic polyester said tertiary amine hydrochloride being dissolved in said water immiscible solution in an amount of from about 2.5 to about 3.5% which comprises:

(a) introducing a water immiscible solution of a halogenated aromatic polyester having the recurring structural formula:

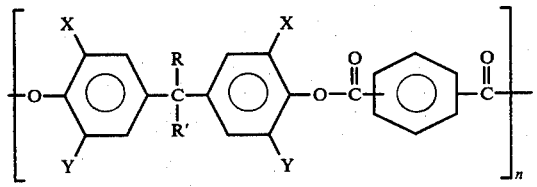

where X which may be the same or different is chlorine or bromine, Y which may be the same or different is hydrogen chlorine or bromine, R and R' may be the same or different and represent lower alkyl groups, hydrogen, or together constitute a cyclic hydrocarbon group, and n=at least 10, dissolved in methylene chloride, said solution having viscosity of from about 10 to about 250 poise and a density of greater than about 1.0 gm/cc, into the top of an extraction column as a discontinuous phase and introducing water into the bottom of the extraction column as a continuous phase to form a twophase mixture comprising an organic phase and an aqueous phase with each phase flowing in countercurrent directions;

(b) controlling the volume ratio of the flow rates of the organic phase to the aqueous phase to be from about 2:1 to about 10:1;

(c) mechanically agitating said mixture (1) in a manner sufficient to permit the aqueous phase to travel at an upward velocity of not less than the relative downward velocity of the organic phase and (2) in a manner sufficient to extract said tertiary amine hydrochloride from the organic phase in an ammount sufficient to yield a whole raffinate having a chloride ion content of from about 500 to about 7 ppm; and (d) controlling the temperature of the two phases to be not greater than about 32° C.

13. The process of claim 12 wherein the viscosity of the polymer solution is from about 15 to about 100 poise, the ratio of the flow rates of the organic phase to the aqueous phase is from about 5:1 to about 10:1 the temperature of the mixture is controlled to be from about 15° to about 25° C., the chloride ion content of the whole raffinate is from about 300 to about 7 ppm and the chloride ion content of the extract is from about 1 to about 15% by weight.

14. The process of claim 12 wherein the viscosity of the polymer solution is from about 30 to about 60 poise, the ratio of the flow rates of the organic phase to the aqueous phase is from about 6:1 to about 9:1, the temperature of the mixture is controlled to be from about 20° to about 23° C., the chloride ion content of the whole raffinate is from about 100 to about 7 ppm and the chloride ion content of the extract is from about 2 to about 12.5% by weight.

15. The process of claim 14 wherein the downward plug flow velocity of the organic phase is about 0.1 to about 20 cm/min.

16. The process of claim 12 wherein the halogenated aromatic polyester of the recurring structural formula is a product of tetrabromobisphenol A and a mixture of about 45 to about 75% by weight isophthaloyl chloride and correspondingly about 55 to about 25% by weight terephthaloyl chloride.

17. The process of claim 12 wherein the halogenated aromatic polyester of the recurring structural formula is a product of tetrabromobisphenol A and a mixture of about 60% by weight isophthaloyl chloride and correspondingly about 40% by weight terephthaloyl chloride.

18. The process of claim 12 wherein said halogenated aromatic polyester of the recurring structural formula is the product of tetrachlorobisphenol A and a mixture of from about 90 to about 40% by weight isophthaloyl chloride and correspondingly from about 10 to about 60% by weight terephthaloyl chloride.

19. The process of claim 18 wherein the halogenated polyester of the recurring structural formula is a product of tetrachlorobisphenol A and a mixture of about 70% by weight isophthaloyl chloride and about 30% by weight terephthaloyl chloride.

20. The process of claim 1, 4 or 12 wherein the temperature in (d) is controlled by means of a water jacket.

* * * * *